(12) United States Patent
Lee et al.

(10) Patent No.: US 12,248,222 B2
(45) Date of Patent: Mar. 11, 2025

(54) DISPLAY DEVICE

(71) Applicant: Samsung Display Co., Ltd., Yongin-Si (KR)

(72) Inventors: Yong Hee Lee, Suwon-si (KR); Dong Hee Shin, Asan-si (KR); Geun Ho Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/173,037

(22) Filed: Feb. 10, 2021

(65) Prior Publication Data

US 2021/0349364 A1   Nov. 11, 2021

(30) Foreign Application Priority Data

May 8, 2020   (KR) ......................... 10-2020-0055138

(51) Int. Cl.
*G02F 1/1362* (2006.01)
*G02F 1/1368* (2006.01)

(52) U.S. Cl.
CPC .. *G02F 1/136286* (2013.01); *G02F 1/136218* (2021.01); *G02F 1/1368* (2013.01)

(58) Field of Classification Search
CPC ......... G02F 1/136286; G02F 1/136218; G02F 1/1368; G02F 1/1337; G02F 1/136227; G02F 1/136263; G02F 1/133512; G02F 1/133707; G02F 1/133711; G02F 1/133753; G02F 1/133788; G02F 1/134309; G02F 1/134336; G02F 1/13439; G02F 1/1362; G02F 1/1396; G02F 1/136259; G02F 1/136213; H01L 27/1255
See application file for complete search history.

(56) References Cited

U.S. PATENT DOCUMENTS

| | | | |
|---|---|---|---|
| 8,179,490 B2* | 5/2012 | Lin ..................... | H01L 27/1255 349/44 |
| 2005/0052445 A1* | 3/2005 | Murakami ........ | G02F 1/136213 345/204 |

(Continued)

FOREIGN PATENT DOCUMENTS

| | | |
|---|---|---|
| KR | 10-2005-0000653 A | 1/2005 |
| KR | 10-1635954 B1 | 7/2016 |

(Continued)

*Primary Examiner* — Hoan C Nguyen
(74) *Attorney, Agent, or Firm* — Innovation Counsel LLP

(57) ABSTRACT

A display device may include a scan line extending in a first direction, a storage line parallel to the scan line, a first data line disposed on the scan line and the storage line, the first data line extending in a second direction crossing the first direction, a second data line parallel to the first data line, a transistor including a control electrode protruding from the scan line, a source electrode protruding from the first data line, and a drain electrode spaced apart from the source electrode and including a drain electrode extending portion, and a pixel electrode disposed between the first data line and the second date line and connected to the drain electrode extending portion. The storage line or the scan line may include a first extending portion between the second data line and the drain electrode extending portion in a plan view.

10 Claims, 12 Drawing Sheets

(56) References Cited

U.S. PATENT DOCUMENTS

| | | | | |
|---|---|---|---|---|
| 2006/0158575 A1* | 7/2006 | Shin | ............... | G02F 1/134309 |
| | | | | 349/38 |
| 2006/0238667 A1* | 10/2006 | Lee | ............... | H01L 27/1255 |
| | | | | 257/E27.113 |
| 2006/0256249 A1* | 11/2006 | Nagano | ............ | G02F 1/134363 |
| | | | | 349/43 |
| 2010/0123845 A1* | 5/2010 | Kim | ............... | H01L 27/124 |
| | | | | 349/46 |
| 2011/0181502 A1* | 7/2011 | Kim | ............... | G09G 3/344 |
| | | | | 345/107 |
| 2013/0083263 A1* | 4/2013 | Kim | ............... | G02F 1/134336 |
| | | | | 349/38 |
| 2013/0088660 A1* | 4/2013 | Kaneko | ............ | H01L 27/15 |
| | | | | 257/59 |
| 2014/0043571 A1* | 2/2014 | Chang | ............ | G02F 1/139 |
| | | | | 349/123 |
| 2016/0246132 A1* | 8/2016 | Cho | ............... | G02F 1/134309 |
| 2016/0282691 A1* | 9/2016 | Kim | ............... | G02F 1/13624 |
| 2016/0334678 A1* | 11/2016 | Yoo | ............... | G02F 1/136209 |
| 2018/0088409 A1* | 3/2018 | Lee | ............... | G02F 1/133512 |
| 2018/0129110 A1* | 5/2018 | Syn | ............... | G02F 1/134336 |

FOREIGN PATENT DOCUMENTS

| | | |
|---|---|---|
| KR | 10-1675372 B1 | 11/2016 |
| KR | 10-1863759 B1 | 6/2018 |
| KR | 10-2018-0089604 A | 8/2018 |

\* cited by examiner

DISPLAY DEVICE

CROSS-REFERENCE TO RELATED APPLICATION(S)

This application claims priority under 35 USC § 119 to Korean Patent Application No. 10-2020-0055138 filed on May 8, 2020 in the Korean Intellectual Property Office (KIPO), the entire disclosure of which is incorporated by reference herein.

BACKGROUND

1. Field

Embodiments relate to a display device. More particularly, embodiments relate to a liquid crystal display device.

2. Description of the Related Art

The importance of display devices is increasing with the development of multimedia. Accordingly, various types of display devices such as a liquid crystal display (LCD) device, an organic light emitting display (OLED) device, or the like are used.

Among the display devices, the liquid crystal display device is one of the most widely used flat panel display devices. The liquid crystal display device may include two display substrates on which electric field generating electrodes are respectively formed and a liquid crystal layer interposed between. The liquid crystal display device may display an image by applying a voltage to the electric field generating electrodes to generate an electric field in the liquid crystal layer, determining alignments of liquid crystal molecules of the liquid crystal layer, and controlling polarization of incident light.

SUMMARY

Embodiments provide a display device in which capacitance deviations between data lines and a pixel decrease.

A display device according to an embodiment may include a scan line, a storage line, a first data line, a second data, a transistor, and a pixel electrode. The scan line extends in a first direction. The storage line is parallel to the scan line. The first data line is disposed on the scan line and the storage line, the first data line extending in a second direction crossing the first direction. The second data line is parallel to the first data line. The transistor includes a control electrode protruding from the scan line, a source electrode protruding from the first data line, and a drain electrode spaced apart from the source electrode and including a drain electrode extending portion. The pixel electrode is disposed between the first data line and the second date line and is connected to the drain electrode extending portion. A first extending portion is between the second data line and the drain electrode extending portion in a plan view.

In an embodiment, a gap between the drain electrode extending portion and the second data line may be less than a gap between the drain electrode extending portion and the first data line.

In an embodiment, the first extending portion may extend in the second direction.

In an embodiment, the storage line may include the first extending portion.

In an embodiment, the scan line may include the first extending portion.

In an embodiment, the display device may further include a shielding electrode disposed on a same layer as the pixel electrode, the shielding electrode overlapping the first data line and the second data line.

In an embodiment, the shielding electrode may include a second extending portion between the second data line and the drain electrode extending portion in the plan view.

In an embodiment, the second extending portion may extend in the first direction.

In an embodiment, the second extending portion may at least partially overlap the first extending portion.

In an embodiment, the storage line may be disposed on a same layer as the scan line.

In an embodiment, the storage line may include a storage electrode overlapping the drain electrode extending portion.

In an embodiment, an area of the storage electrode may be less than an area of the drain electrode extending portion.

A display device according to an embodiment may include a first pixel, a second pixel, a scan line, a storage line, a first data line, and a second data line. The first pixel includes a transistor and a pixel electrode connected to the transistor. The second pixel is adjacent to the first pixel in a first direction. The scan line extends in the first direction, the scan line configured to provide a scan signal to the first pixel and the second pixel. The storage line is parallel to the scan line, the storage line configured to provide a storage voltage to the first pixel and the second pixel. The first data line is disposed on the scan line and the storage line, the first data line extending in a second direction crossing the first direction and configured to provide a first data signal to the first pixel. The second data line is parallel to the first data line, the second data line configured to provide a second data signal to the second pixel. A first extending portion is between the second data line and a pixel electrode connecting portion in which the transistor and the pixel electrode are connected in a plan view.

In an embodiment, a gap between the pixel electrode connecting portion and the second data line may be less than a gap between the pixel electrode connecting portion and the first data line.

In an embodiment, the first extending portion may extend in the second direction.

In an embodiment, the storage line may include the first extending portion.

In an embodiment, the scan line may include the first extending portion.

In an embodiment, the display device may further include a shielding electrode disposed on a same layer as the pixel electrode, the shielding electrode overlapping the first data line and the second data line.

In an embodiment, the shielding electrode may include a second extending portion between the second data line and the pixel electrode connecting portion in the plan view.

In an embodiment, the second extending portion may extend in the first direction.

In the display device according to the embodiments, the first extending portion protruding to between the second data line and the drain electrode extending portion of the pixel may be formed in the storage line or the scan line, so that the first extending portion may shield between the second data line and the drain electrode extending portion of the pixel. Accordingly, capacitance deviations between the first and the second data lines and the pixel may decrease, and image quality of the display device may be improved.

BRIEF DESCRIPTION OF THE DRAWINGS

Illustrative, non-limiting embodiments will be more clearly understood from the following detailed description taken in conjunction with the accompanying drawings.

DETAILED DESCRIPTION OF THE EMBODIMENTS

Hereinafter, display devices in accordance with embodiments will be explained in detail with reference to the accompanying drawings.

Hereinafter, a display device according to an embodiment will be described with reference to FIGS. 1 to 7.

Figure 1:
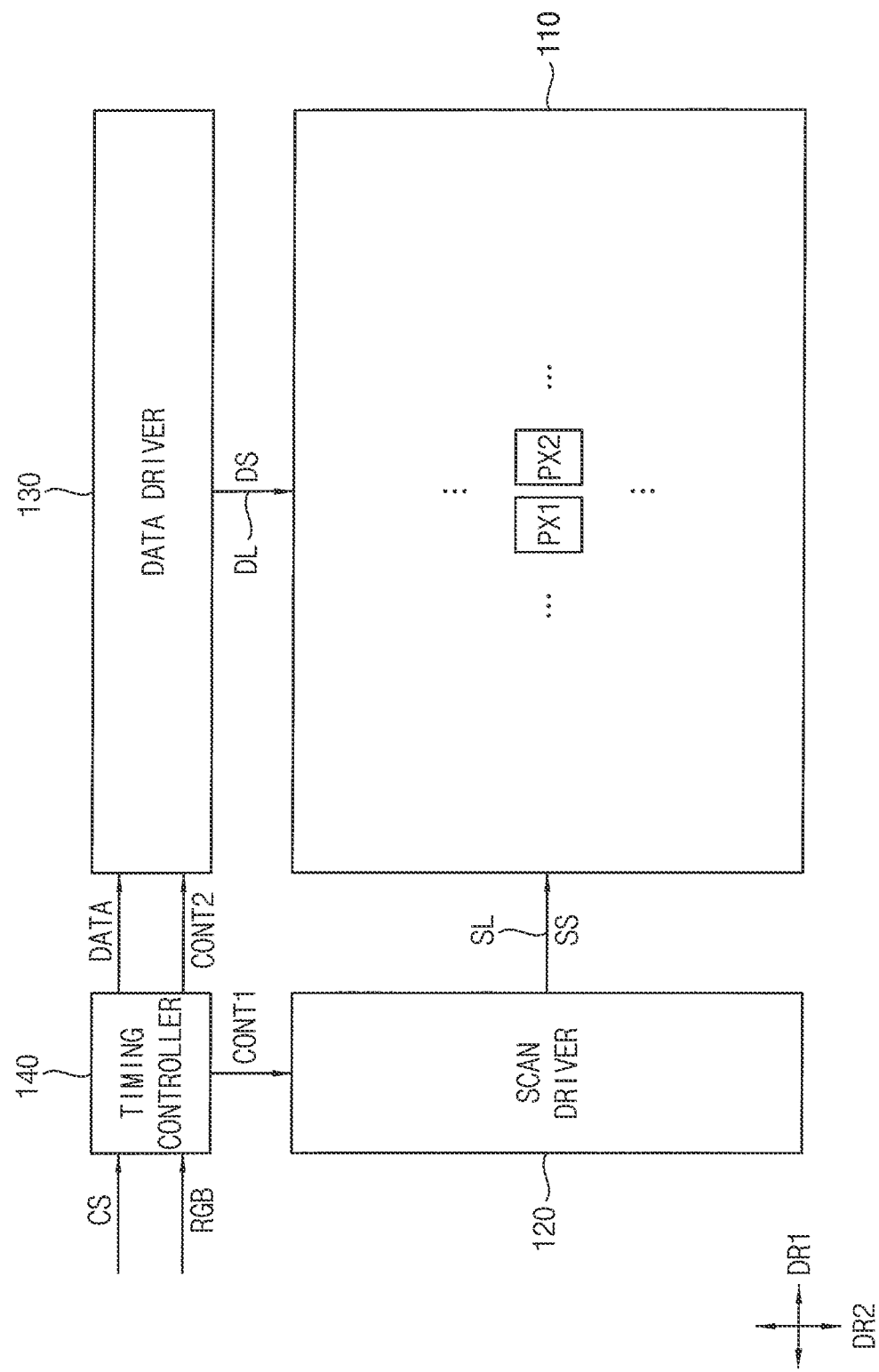
FIG. 1 is a block diagram illustrating a display device according to an embodiment.

FIG. 1 is a block diagram illustrating a display device according to an embodiment.

Referring to FIG. 1, the display device according to an embodiment may include a display unit 110, a scan driver 120, a data driver 130, and a timing controller 140.

The display unit 110 may display an image. Pixels including a first pixel PX1 and a second pixel PX2 may be disposed in the display unit 110. The pixels may be arranged along a first direction DR1 and a second direction DR2 crossing the first direction DR1 as a matrix form.

Each of the pixels may be electrically connected to one of scan lines SL and one of data lines DL. The scan lines SL may extend in the first direction DR1. The data lines DL may extend in the second direction DR2. For example, the first direction DR1 may be a row direction, and the second direction DR2 may be a column direction, as illustrated in FIG. 1.

The scan driver 120 may generate a scan signal SS based on a first control signal CONT1 provided from the timing controller 140. The scan driver 120 may provide the scan signal SS to the pixels disposed in the display unit 110 through the scan lines SL. In an embodiment, the scan driver 120 may include transistors. In an embodiment, the scan driver 120 may be an integrated circuit.

The data driver 130 may receive a second control signal CONT2 and image data DATA from the timing controller 140. The data driver 130 may generate a data signal DS based on the second control signal CONT2 and the image data DATA. The data driver 130 may provide the data signal DS to the pixels disposed in the display unit 110 through the data lines DL. In an embodiment, the data driver 130 may include a shift register, a latch, a digital-analog converter, or the like.

The timing controller 140 may receive an image signal RGB and a control signal CS from outside. The timing controller 140 may process the image signal RGB and the control signal CS for the operating condition of the display unit 110, and may generate the image data DATA, the first control signal CONT1, and the second control signal CONT2.

The image signal RGB may include grayscale data provided to the display unit 110. The control signal CS may include a horizontal synchronization signal, a vertical synchronization signal, a main clock signal, or similar signals. The horizontal synchronization signal may represent a time taken to display one pixel row of the display unit 110. The vertical synchronization signal may represent a time taken to display an image of one frame. The main clock signal may be a signal that serves as a reference for generating signals by synchronizing the timing controller 140 with the scan driver 120 and the data driver 130.

Figure 2:
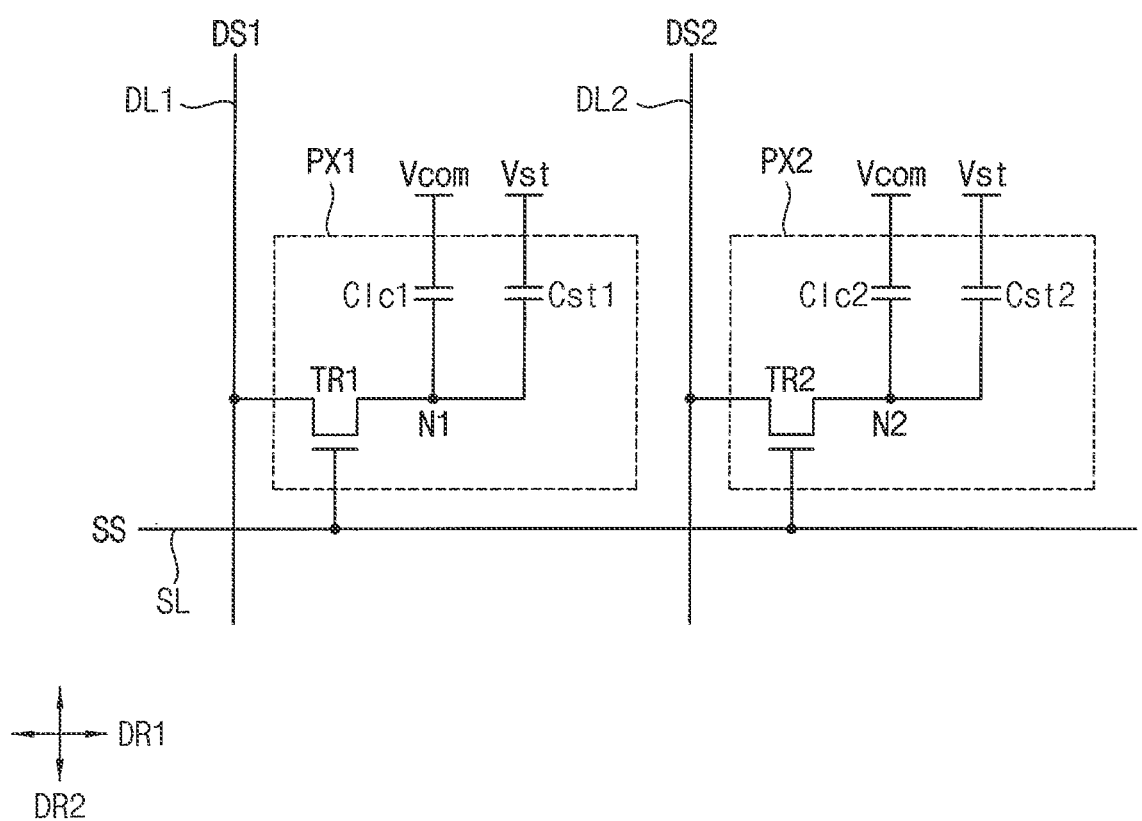
FIG. 2 is an equivalent circuit diagram illustrating a first pixel and a second pixel in FIG. 1.

FIG. 2 is an equivalent circuit diagram illustrating the first pixel PX1 and the second pixel PX2 in FIG. 1.

Referring to FIG. 2, the display device may include the first pixel PX1 and the second pixel PX2. The second pixel PX2 may be adjacent to the first pixel PX1 in the first direction DR1. Accordingly, the first pixel PX1 and the second pixel PX2 may be included in one pixel row.

The first pixel PX1 and the second pixel PX2 may receive different data signals from different data lines. For example, the first pixel PX1 may receive a first data signal DS1 from a first data line DL1, and the second pixel PX2 may receive a second data signal DS2 different from the first data signal DS1 from a second data line DL2 disposed in the first direction DR1 from the first data line DL1.

The first pixel PX1 and the second pixel PX2 may receive a scan signal from the same scan line. For example, the first pixel PX1 and the second pixel PX2 may receive a scan signal SS from a scan line SL.

Each of the first pixel PX1 and the second pixel PX2 may include a transistor, a liquid crystal capacitor, and a storage capacitor. The first pixel PX1 may include a first transistor TR1, a first liquid crystal capacitor Clc1 and a first storage capacitor Cst1. The second pixel PX2 may include a second transistor TR2, a second liquid crystal capacitor Clc2 and a second storage capacitor Cst2. Hereinafter, both the first pixel PX1 and the second pixel PX2 will be described in more detail based on the first pixel PX1.

The first transistor TR1 may include a control electrode, a source electrode, and a drain electrode. The control electrode of the first transistor TR1 may be connected to the scan line SL. The source electrode of the first transistor TR1 may be connected to the first data line DL1, and the drain electrode of the first transistor TR1 may be connected to a first node N1. The first transistor TR1 may perform a switching operation based on the scan signal SS provided from the scan line SL, and may provide the first data signal DS1 provided from the first data line DL1 to the first node N1.

Figure 7:
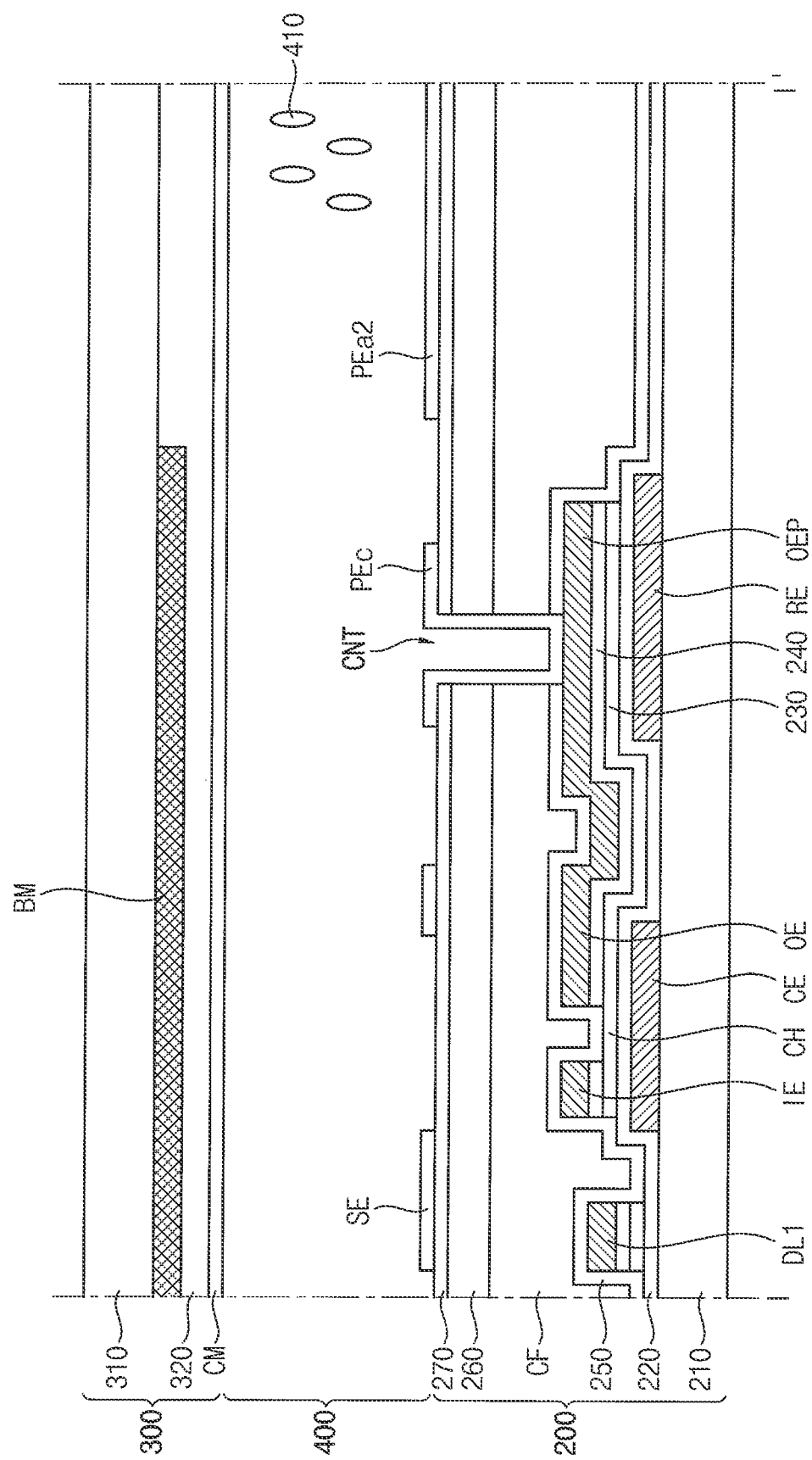
FIG. 7 is a cross-sectional view taken along a line I-I' in FIG. 3.

The first liquid crystal capacitor Clc1 may be formed between the first node N1 and a common electrode CM in FIG. 7 to which a common voltage Vcom is provided. The first storage capacitor Cst1 may be formed between the first node N1 and a storage line RL in FIG. 3 to which a storage voltage Vst is provided.

Hereinafter, driving of the display device according to an embodiment will be described based on the first pixel PX1 and the second pixel PX2.

The first transistor TR1 may perform a switching operation based on the scan signal SS, and the second transistor TR2 may perform a switching operation based on the scan signal SS. Accordingly, the first transistor TR1 and the second transistor TR2 may perform the same switching operation. However, since the first transistor TR1 is connected to the first data line DL1 and the second transistor TR2 is connected to the second data line DL2, different data signals may be provided to the first node N1 and the second node N2.

Figure 3:
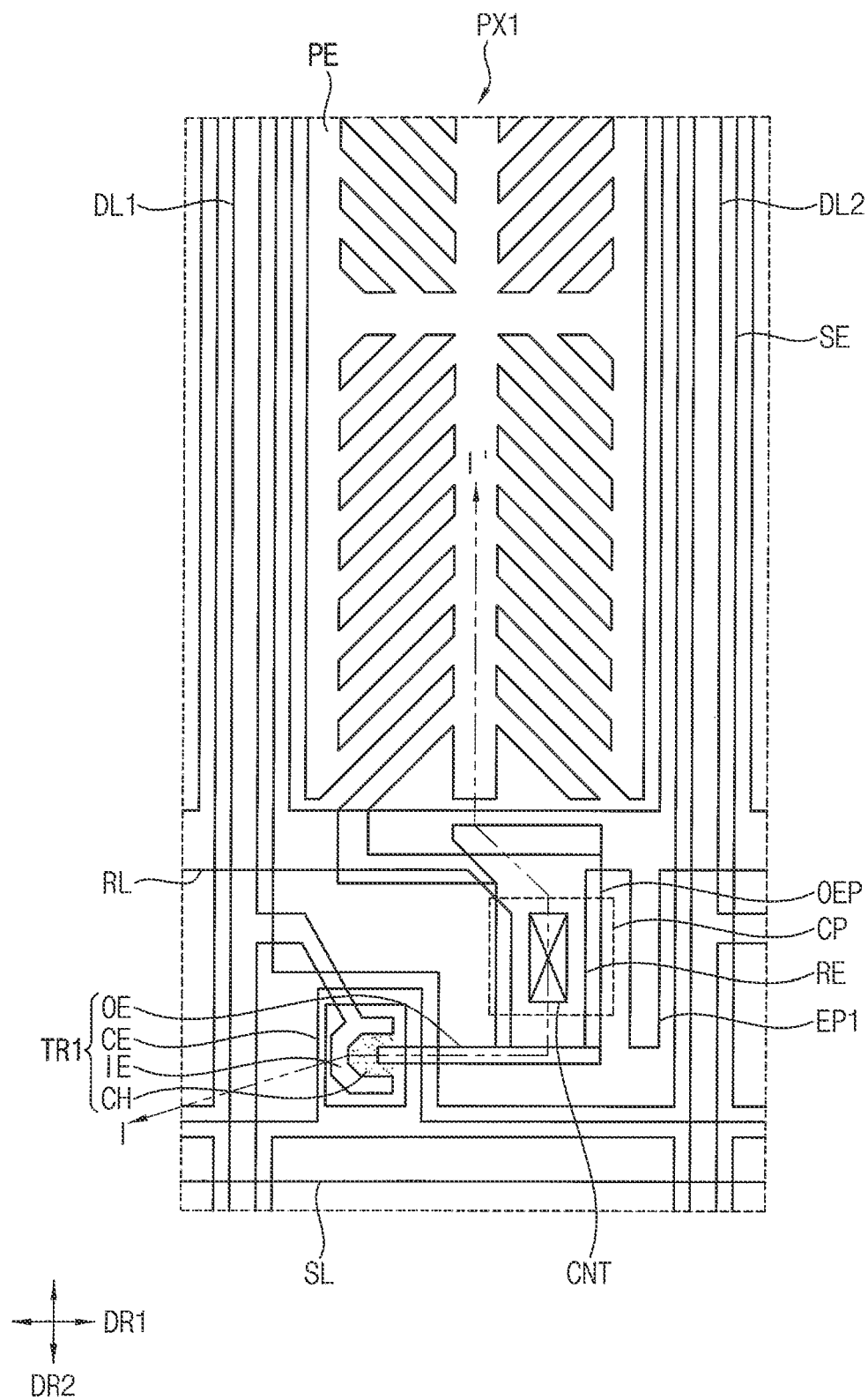
FIG. 3 is a layout diagram illustrating the first pixel in FIG. 1.
Figure 4:
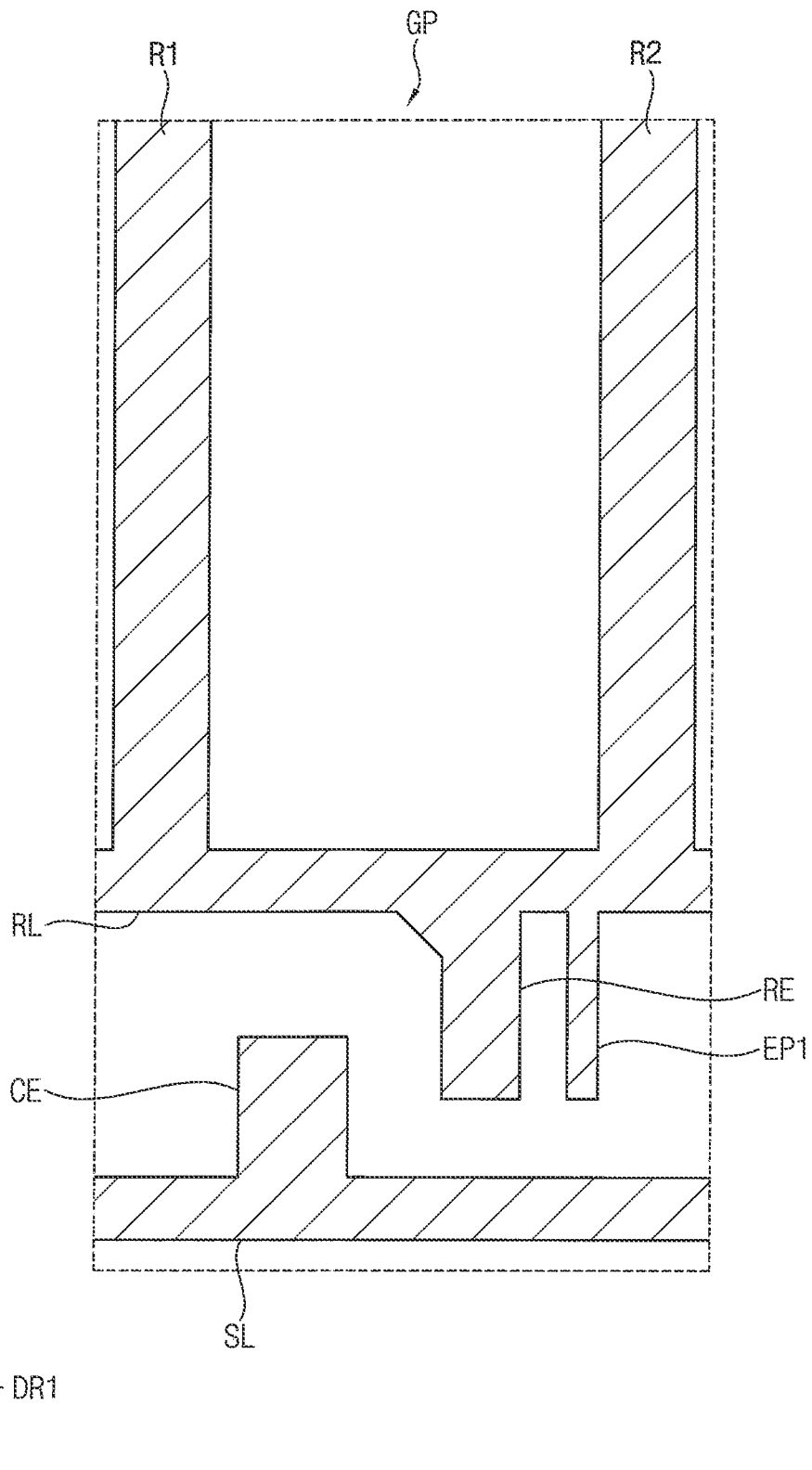
FIG. 4 is a diagram illustrating a gate pattern included in the first pixel in FIG. 3.
Figure 5:
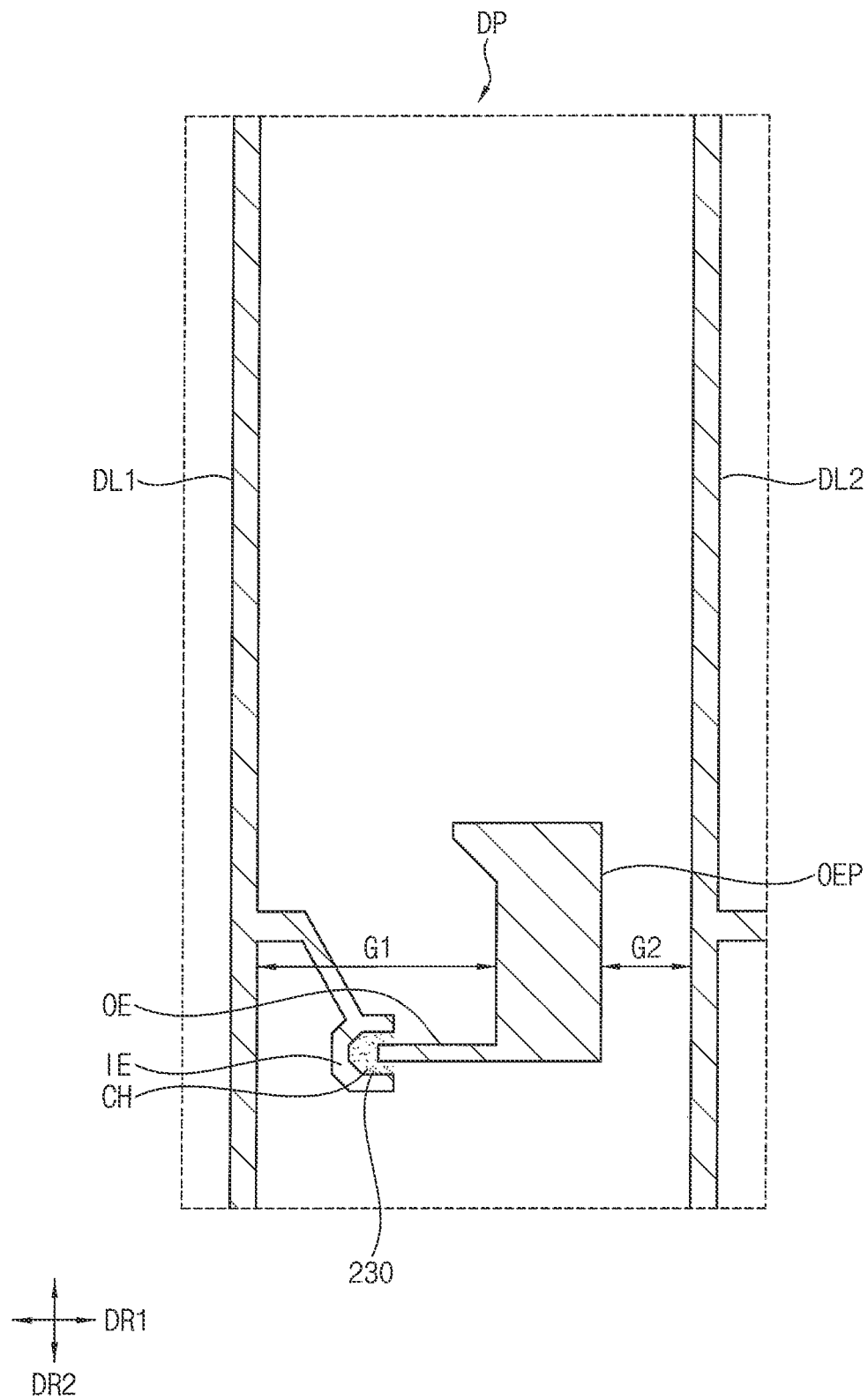
FIG. 5 is a diagram illustrating a data pattern included in the first pixel in FIG. 3.
Figure 6:
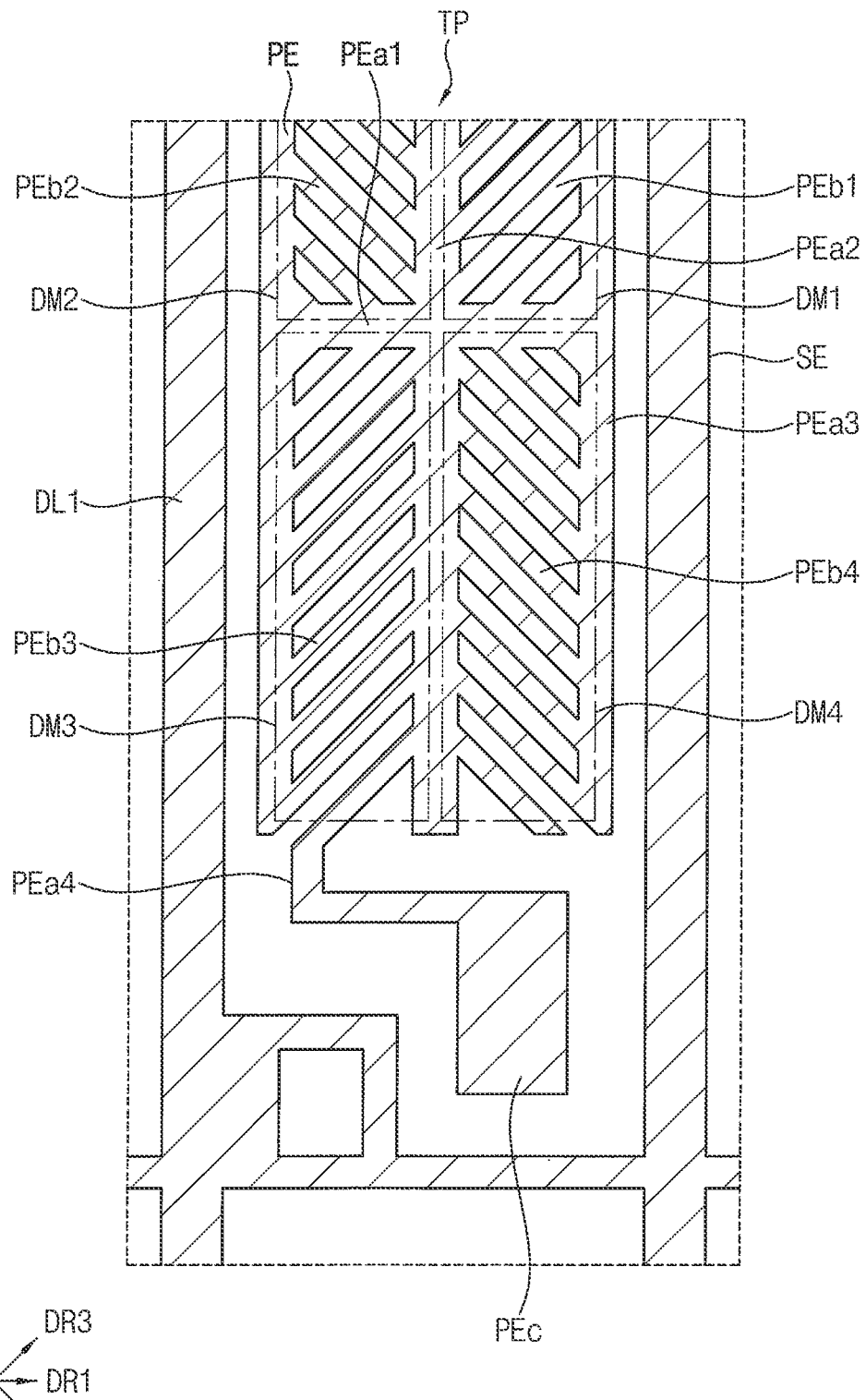
FIG. 6 is a diagram illustrating a transparent conductive pattern included in the first pixel in FIG. 3.

FIG. 3 is a layout diagram illustrating the first pixel PX1 in FIG. 1. FIG. 4 is a diagram illustrating a gate pattern included in the first pixel PX1 in FIG. 3. FIG. 5 is a diagram illustrating a data pattern included in the first pixel PX1 in FIG. 3. FIG. 6 is a diagram illustrating a transparent conductive pattern included in the first pixel PX1 in FIG. 3. FIG. 7 is a cross-sectional view taken along a line I-I' in FIG. 3. Hereinafter, both the first pixel PX1 and the second pixel PX2 will be described based on the first pixel PX1 for convenience of description.

Referring to FIGS. 3, 4, 5, 6, and 7, the display device may include a first display substrate 200, a second display substrate 300, and a liquid crystal layer 400.

The first display substrate 200 and the second display substrate 300 may be disposed to face each other. The liquid crystal layer 400 may be interposed between the first display substrate 200 and the second display substrate 300. The liquid crystal layer 400 may include liquid crystal molecules 410. In an embodiment, the first display substrate 200 and the second display substrate 300 may be combined by a sealing member.

The first display substrate 200 may include a first substrate 210, a gate pattern GP, a gate insulation layer 220, a data pattern DP, a first passivation layer 250, a color filter CF, an organic insulation layer 260, a second passivation layer 270, and a transparent conductive pattern TP.

In an embodiment, the first substrate 210 may be a transparent insulating substrate. The transparent insulating substrate may include glass, quartz, light-transmitting plastic, or the like. In an embodiment, the first substrate 210 may be a flexible substrate, or may be a structure in which films are stacked.

The gate pattern GP may be disposed on the first substrate 210. The gate pattern GP may include a scan line SL, a control electrode CE, a storage line RL, and a storage electrode RE.

The scan line SL may extend in the first direction DR1. The control electrode CE may protrude from the scan line SL. In an embodiment, the control electrode CE may protrude in the second direction DR2 from the scan line SL.

The storage line RL may be parallel to the scan line SL. The storage line RL may be disposed on the same layer as the scan line SL. In an embodiment, the storage line RL may be disposed to surround at least a portion of a pixel electrode PE. For example, the storage line RL may include a first portion R1 surrounding a left portion of the pixel electrode PE and a second portion R2 surrounding a right portion of the pixel electrode PE.

The storage line RL may overlap at least a portion of the pixel electrode PE. Since the storage line RL overlaps the pixel electrode PE, the first storage capacitor Cst1 may be formed by the storage line RL and the pixel electrode PE.

The storage electrode RE may protrude from the storage line RL. In an embodiment, the storage electrode RE may protrude in the second direction DR2 from the storage line RL. The storage electrode RE may overlap at least a portion of a drain electrode extending portion OEP described below. Because the storage electrode RE overlaps the drain electrode extending portion OEP, the first storage capacitor Cst1 may be formed by the storage electrode RE and the drain electrode extending portion OEP.

In an embodiment, an area of the storage electrode RE may be less than an area of the drain electrode extending portion OEP. Because the area of the storage electrode RE is less than the area of the drain electrode extending portion OEP, the storage electrode RE may be disposed inside the drain electrode extending portion OEP in a plan view although a tolerance occurs in the process of forming the data pattern DP on the gate pattern GP. Accordingly, a capacitance of the storage capacitor Cst1 formed by the storage electrode RE and the drain electrode extending portion OEP may be constant.

The gate pattern GP may be formed as a single layer including one of aluminum (Al), copper (Cu), molybdenum (Mo), chromium (Cr), titanium (Ti) and tungsten (W), a double layer including two thereof, or a triple layer including three thereof. The scan line SL, the control electrode CE, the storage line RL, and the storage electrode RE included in the gate pattern GP may be substantially simultaneously formed by the same photomask.

The gate insulation layer 220 may be disposed on the gate pattern GP. In an embodiment, the gate insulation layer 220 may be formed of silicon nitride, silicon oxide, or similar materials. The gate insulation layer 220 may have a multilayer structure including at least two layers having different physical characteristics.

The data pattern DP may be disposed on the gate insulation layer 220. The data pattern DP may include a first data line DL1, a second data line DL2, a source electrode IE, a drain electrode OE, and a semiconductor layer 230. A channel region CH of the first transistor TR1 may be formed in the semiconductor layer 230 between the source electrode IE and the drain electrode OE.

The semiconductor layer 230 may be disposed on the gate insulation layer 220. In an embodiment, the semiconductor layer 230 may be formed of amorphous silicon, polycrystalline silicon, or similar materials. In an embodiment, the semiconductor layer 230 may be formed of an oxide semiconductor. When the semiconductor layer 230 is formed of the oxide semiconductor, the semiconductor layer 230 may be formed of one of oxide semiconductors including IGZO, ZnO, $ZnO_2$, CdO, SrO, $SrO_2$, CaO, $CaO_2$, MgO, $MgO_2$, InO, $In_2O$, GaO, $Ga_2O$, $Ga_2O_3$, SnO, $SnO_2$, GeO, $GeO_2$, PbO, $Pb_2O_3$, $Pb_3O_4$, TiO, $TiO_2$, $Ti_2O_3$, and $Ti_3O_5$.

In an embodiment, the data pattern DP may further include an ohmic contact layer 240. The ohmic contact layer 240 may be disposed on the semiconductor layer 230. The ohmic contact layer 240 may be formed of a material such as n+ hydrogenated amorphous silicon doped with a high concentration of n-type impurities such as phosphorus, or may be formed of silicide. However, when the semiconductor layer 230 is formed of an oxide semiconductor, the ohmic contact layer 240 may be omitted. Hereinafter, it will be described that the data pattern DP includes the ohmic contact layer 240 in the present specification.

The first data line DL1, the second data line DL2, the source electrode IE, and the drain electrode OE may be disposed on the gate insulation layer 220 and the ohmic contact layer 240. The source electrode IE may protrude from the first data line DL1, and at least a portion of the source electrode IE may overlap the control electrode CE. The drain electrode OE may be spaced apart from the source electrode IE, and at least a portion of the drain electrode OE may overlap the control electrode CE. The drain electrode OE may include the drain electrode extending portion OEP.

The drain electrode extending portion OEP may overlap the storage electrode RE and the pixel electrode PE.

FIGS. 3 and 5 illustrate that the source electrode IE has an 'U' shape in a plan view and the drain electrode OE is surrounded by the source electrode IE, however, the control electrode CE, the source electrode IE, the drain electrode OE, and the channel region CH may form the first transistor TR1.

The drain electrode extending portion OEP may be positioned in the first direction DR1 from the first transistor TR1 in a plan view. The first transistor TR1 may be positioned adjacent to the first data line DL1 in a plan view, and the drain electrode extending portion OEP may be positioned adjacent to the second data line DL2 in a plan view.

The data pattern DP may be formed as a single layer including one of aluminum (Al), copper (Cu), molybdenum (Mo), chromium (Cr), titanium (Ti) and tungsten (W), a double layer including two thereof, or a triple layer including three thereof. The first data line DL1, the second data line DL2, the source electrode IE, the drain electrode OE, the semiconductor layer 230, and the ohmic contact layer 240 included in the data pattern DP may be substantially simultaneously formed by the same photomask.

The first passivation layer 250 may be disposed on the data pattern DP. The first passivation layer 250 may include an opening portion exposing at least a portion of the drain electrode extending portion OEP. In an embodiment, the first passivation layer 250 may be formed of an inorganic insulating material such as silicon nitride, silicon oxide, or similar materials. The first passivation layer 250 may prevent a pigment of the color filter CF from flowing into the channel region CH.

The color filter CF may be disposed on the first passivation layer 250. The color filter CF may include an opening portion overlapping the opening portion of the first passivation layer 250 and exposing at least a portion of the drain electrode extending portion OEP.

Light passing through the color filter CF may display one of primary colors such as red, green, blue, or similar colors. However, the light may also display any one of cyan, magenta, yellow and white. In an embodiment, the color filter CF may be formed of materials that display different colors for each of the pixels adjacent in the first direction DR1, for example, the first pixel PX1 and the second pixel PX2, and may be formed of a material that displays the same color for each of the pixels adjacent in the second direction DR2. However, in an embodiment, the color filter CF may be formed of materials that display different colors for each of the adjacent pixels regardless of the direction. FIG. 7 illustrates that color filter CF is disposed in the first display substrate 200, however, the color filter CF may be disposed in the second display substrate 300.

The organic insulation layer 260 may be disposed on the first passivation layer 250 and the color filter CF. The organic insulation layer 260 may include an opening portion overlapping the opening portion of the first passivation layer 250 and exposing at least a portion of the drain electrode extending portion OEP. The organic insulation layer 260 may include an organic material having excellent planarization characteristics and photosensitivity. The organic insulation layer 260 may be omitted.

The second passivation layer 270 may be disposed on the organic insulation layer 260. The second passivation layer 270 may include an opening portion overlapping the opening portion of the first passivation layer 250 and exposing at least a portion of the drain electrode extending portion OEP. In an embodiment, the second passivation layer 270 may be formed of an inorganic insulating material such as silicon nitride, silicon oxide, or similar materials. The second passivation layer 270 may be omitted.

The opening portion of the first passivation layer 250, the opening portion of the color filter CF, the opening portion of the organic insulation layer 260, the opening portion of the second passivation layer 270 may form a contact hole CNT.

The transparent conductive pattern TP may be disposed on the second passivation layer 270. The transparent conductive pattern TP may include a transparent conductive material. In an embodiment, the transparent conductive material may include polycrystalline, single crystal, or amorphous indium tin oxide (ITO).

The transparent conductive pattern TP may include the pixel electrode PE and a shielding electrode SE. The pixel electrode PE and the shielding electrode SE may be disposed on the same layer, and may be physically and electrically insulated from each other.

The shielding electrode SE may have a shape extending in the first direction DR1. The shielding electrode SE may include a horizontal stem extending in the first direction DR1 and vertical stems extending in the second direction DR2 from the horizontal stem. In an embodiment, the horizontal stem of the shielding electrode SE may at least partially overlap the scan line SL. The vertical stems of the shielding electrode SE may at least partially overlap the first data line DL1 and the second data line DL2. Further, the vertical stems of the shielding electrode SE may at least partially overlap the first region R1 and the second region R2 of the storage line RL. In an embodiment, a voltage level of a voltage provided to the shielding electrode SE may be substantially the same as a voltage level of the common voltage Vcom in FIG. 2 provided to the common electrode CM. In an embodiment, the common voltage Vcom may be directly provided to the shielding electrode SE.

The pixel electrode PE may directly contact the drain electrode extending portion OEP exposed by the contact hole CNT. In this case, a portion in which the first transistor TR1 and the pixel electrode PE are connected through the contact hole CNT in a plan view may be defined as a pixel electrode connecting portion CP. Further, the pixel electrode PE may overlap the common electrode CM. Accordingly, the first liquid crystal capacitor Clc1 in FIG. 2 may be formed between the pixel electrode PE and the common electrode CM that overlap each other.

The pixel electrode PE may include a first stem portion PEa1, a second stem portion PEa2, an edge stem portion PEa3, and a connection stem portion PEa4. The first stem portion PEa1 extends in the first direction DR1. The second stem portion PEa2 crosses the first stem portion PEa1 and extends in the second direction DR2. The edge stem portion PEa3 physically connects to the first stem portion PEa1 and the second stem portion PEa2 and physically connects to an end of each of branch portions PEb1 to Peb4 described below. The connection stem portion PEa4 is physically spaced apart from the first stem portion PEa1, the second stem portion PEa2, and the edge stem portion PEa3 and includes a connection portion PEc.

The connection portion PEc may be defined as a portion that overlaps the contact hole CNT. Therefore, the connection portion PEc of the pixel electrode PE may be directly connected to the drain electrode extending portion OEP exposed by the contact hole CNT.

The pixel electrode PE may include a first branch portion PEb1, a second branch portion PEb2, a third branch portion PEb3, and a fourth branch portion PEb4 which extend from the first stem portion PEa1 and the second stem portion PEa2.

The first branch portion PEb1 may extend in a third direction DR3 from the first stem portion PEa1 and the second stem portion PEa2, and may be physically connected to the edge stem portion PEa3. The second branch portion PEb2 may extend in a fourth direction DR4 from the first stem portion PEa1 and the second stem portion PEa2, and may be physically connected to the edge stem portion PEa3. The third branch portion PEb3 may extend in a fifth direction DR5 from the first stem portion PEa1 and the second stem portion PEa2. A first part of the third branch portion PEb3 may be physically connected to the edge stem portion PEa3, and a second part of the third branch portion PEb3 may be physically connected to the connection stem portion PEa4. The fourth branch portion PEb4 may extend in a sixth direction DR6 from the first stem portion PEa1 and the second stem portion PEa2. A first part of the fourth branch portion PEb4 may be physically connected to the edge stem portion PEa3, and a second part of the fourth branch portion PEb4 may not be physically connected to the edge stem portion PEa3.

The stem portions PEa1 to PEa4 and the branch portions PEb1 to PEb4 of the pixel electrode PE may be electrically connected. Accordingly, the stem portions PEa1 to PEa4 and the branch portions PEb1 to PEb4 may have the same electric potential.

The pixel electrode PE may include four domain regions based on the first stem portion PEa1 and the second stem portion PEa2. A first domain region DM1 may be defined as a region positioned in the third direction DR3 from an intersection between the first stem portion PEa1 and the second stem portion PEa2. A second domain region DM2 may be defined as a region positioned in the fourth direction DR4 from the intersection between the first stem portion PEa1 and the second stem portion PEa2. A third domain region DM3 may be defined as a region positioned in the fifth direction DR5 from the intersection between the first stem portion PEa1 and the second stem portion PEa2. A fourth domain region DM4 may be defined as a region positioned in the sixth direction DR6 from the intersection between the first stem portion PEa1 and the second stem portion PEa2.

The first domain region DM1 may include the first branch portion PEb1. The second domain region DM2 may include the second branch portion PEb2. The third domain region DM3 may include the third branch portion PEb3. The fourth domain region DM4 may include the fourth branch portion PEb4.

In an embodiment, an area of the first domain region DM1 and an area of the second domain region DM2 may be substantially the same, and an area of the third domain region DM3 and an area of the fourth domain region DM4 may be substantially the same. However, in an embodiment, areas of the domain regions may be different from each other. For example, an area of the first domain region DM1 may be greater than an area of the second domain region DM2.

The liquid crystal molecules 410 disposed in the first domain region DM1 may be aligned in the third direction DR3 or the fifth direction DR5 when an electric field is formed in the liquid crystal layer 400. The liquid crystal molecules 410 disposed in the second domain region DM2 may be aligned in the fourth direction DR4 or the sixth direction DR6 when an electric field is formed in the liquid crystal layer 400. The liquid crystal molecules 410 disposed in the third domain region DM3 may be aligned in the fifth direction DR5 or the third direction DR3 when an electric field is formed in the liquid crystal layer 400. The liquid crystal molecules 410 disposed in the fourth domain region DM4 may be aligned in the sixth direction DR6 or the fourth direction DR4 when an electric field is formed in the liquid crystal layer 400. In an embodiment, alignment directions of the liquid crystal molecules 410 may be different from each other in the domain regions DM1 to DM4. In this case, the display device may provide a screen with a relatively wide viewing angle.

A first alignment layer may be disposed on the transparent conductive pattern TP. The first alignment layer may induce initial alignments of the liquid crystal molecules 410 in the liquid crystal layer 400.

As described above, the drain electrode extending portion OEP may be disposed adjacent to the second data line DL2. In this case, a gap G2 between the drain electrode extending portion OEP and the second data line DL2 may be less than a gap G1 between the drain electrode extending portion OEP and the first data line DL1. In other words, a gap between the pixel electrode connecting portion CP and the second data line DL2 may be less than a gap between the pixel electrode connecting portion CP and the first data line DL1. When the gap G2 between the drain electrode extending portion OEP and the second data line DL2 is less than the gap G1 between the drain electrode extending portion OEP and the first data line DL1, a capacitance between the first pixel PX1 and the second data line DL2 may be greater than a capacitance between the first pixel PX1 and the first data line DL1. Accordingly, a capacitance deviation between the first pixel PX1 and the data lines DL1 and DL2 may be relatively large, and an image quality of the display device may be reduced due to the capacitance deviation.

To reduce the capacitance deviation between the first pixel PX1 and the data lines DL1 and DL2, the storage line RL may include a first extending portion EP1 protruding to be between the second data line DL2 and the drain electrode extending portion OEP in a plan view. In other words, the first extending portion EP1 may protrude to be between the second data line DL2 and the pixel electrode connecting portion CP in a plan view.

In an embodiment, the first extending portion EP1 may extend in the second direction DR2. The first extending portion EP1 may extend from the storage line RL toward the scan line SL between the second data line DL2 and the drain electrode extending portion OEP in a plan view.

The first extending portion EP1 may be disposed between the second data line DL2 and the drain electrode extending portion OEP in a plan view. The storage voltage Vst in FIG. 2 may be provided to the first extending portion EP1, so that the first extending portion EP1 may shield between the second data line DL2 and the drain electrode extending portion OEP. Accordingly, the capacitance between the first pixel PX1 and the second data line DL2 may decrease, and the capacitance deviation between the first pixel PX1 and the data lines DL1 and DL2 may decrease.

The second display substrate 300 may include a second substrate 310, a black matrix BM, a planarization layer 320, and the common electrode CM.

The second substrate 310 may be disposed to opposite to the first substrate 210. The second substrate 310 may be a transparent insulating substrate. In an embodiment, the second substrate 310 may be formed of the same material as the first substrate 210.

The black matrix BM may be disposed on the second substrate 310. The black matrix BM may be disposed along the first direction DR1 in an inactive region. The inactive region is a boundary between pixels adjacent in the second direction DR2, and the branch portions PEb1 to PEb4 of the pixel electrode PE may not disposed in the inactive region. The black matrix BM may extend in the first direction DR1, and may overlap the scan line SL.

The black matrix BM may prevent light from being transmitted through the inactive region. In an embodiment, the black matrix BM may be formed of a photosensitive material, an organic material, a metallic material, or the like. For example, the photosensitive material may include binder resin, polymerizable monomer, polymerizable oligomer, pigment, dispersant, or the like. Further, the metallic material may include chromium (Cr) or the like.

The black matrix BM extending in the second direction DR2 may not be disposed between the pixels adjacent in the first direction DR1, for example, between the first pixel PX1 and the second pixel PX2. The liquid crystal alignment may be adjusted so that light may not pass through between pixels adjacent in the first direction DR1 without the black matrix BM by adjusting a space between the pixels adjacent in the first direction DR1. Further, the liquid crystal alignment may be adjusted using the shielding electrode SE so that light may not pass through.

The planarization layer 320 may be disposed on the black matrix BM. The planarization layer 320 may provide a planarized surface to the common electrode CM. In an embodiment, the planarization layer 320 may be formed of an organic material or an inorganic material.

The common electrode CM may be disposed on the planarization layer 320. At least a portion of the common electrode CM may overlap the pixel electrode PE. In an embodiment, the common electrode CM may be formed of a transparent conductive material such as ITO, IZO, or similar materials or reflective metal such as aluminum (Al), silver (Ag), chromium (Cr), an alloy thereof, or similar materials.

A second alignment layer may be disposed on the common electrode CM. The second alignment layer may induce initial alignments of the liquid crystal molecules 410 in the liquid crystal layer 400. In an embodiment, the second alignment layer may be formed of substantially the same material as the first alignment layer.

The liquid crystal layer 400 may include the liquid crystal molecules 410. In an embodiment, the liquid crystal molecules 410 may have negative dielectric anisotropy, and may be vertically aligned in an initial alignment state. The liquid crystal molecules 410 may have a predetermined pre-tilted angle in the initial alignment state. Initial alignments of the liquid crystal molecules 410 may be induced by the first alignment layer and the second alignment layer. When an electric field is formed between the first display substrate 200 and the second display substrate 300, the liquid crystal molecules 410 may be inclined or rotated in a specific direction thus changing the polarization state of light passing through the liquid crystal layer 400.

Hereinafter, a display device according to an embodiment will be described with reference to FIGS. 8 and 9. The display device described with reference to FIGS. 8 and 9 may be substantially the same as or similar to the display device described with reference to FIGS. 1 to 7 except for an second extending portion. Accordingly, descriptions on repeated elements will be omitted.

Figure 8:
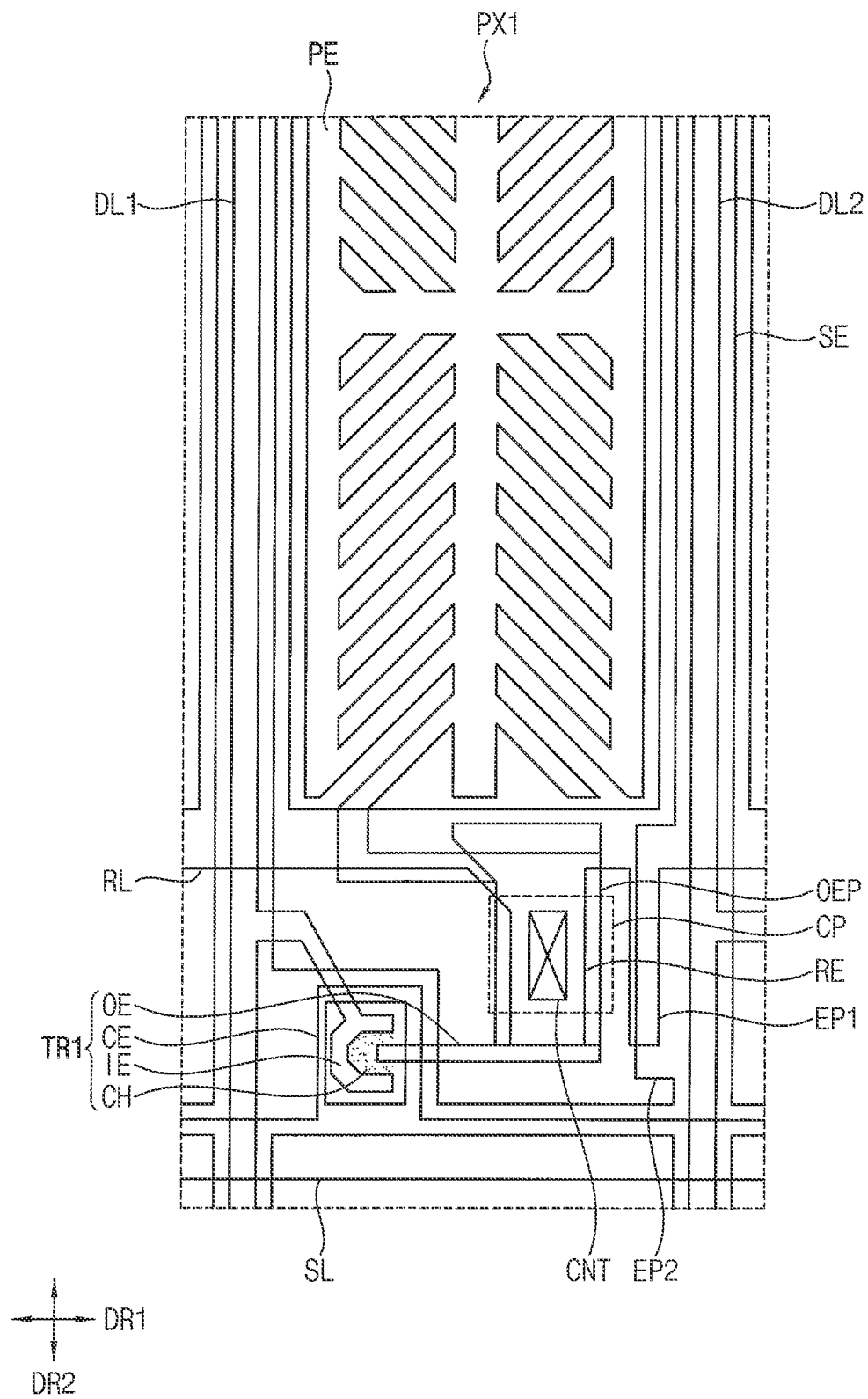
FIG. 8 is a layout diagram illustrating a first pixel of a display device according to an embodiment.

FIG. 8 is a layout diagram illustrating a first pixel of a display device according to an embodiment. FIG. 9 is a diagram illustrating a transparent conductive pattern included in the first pixel in FIG. 8.

Figure 9:
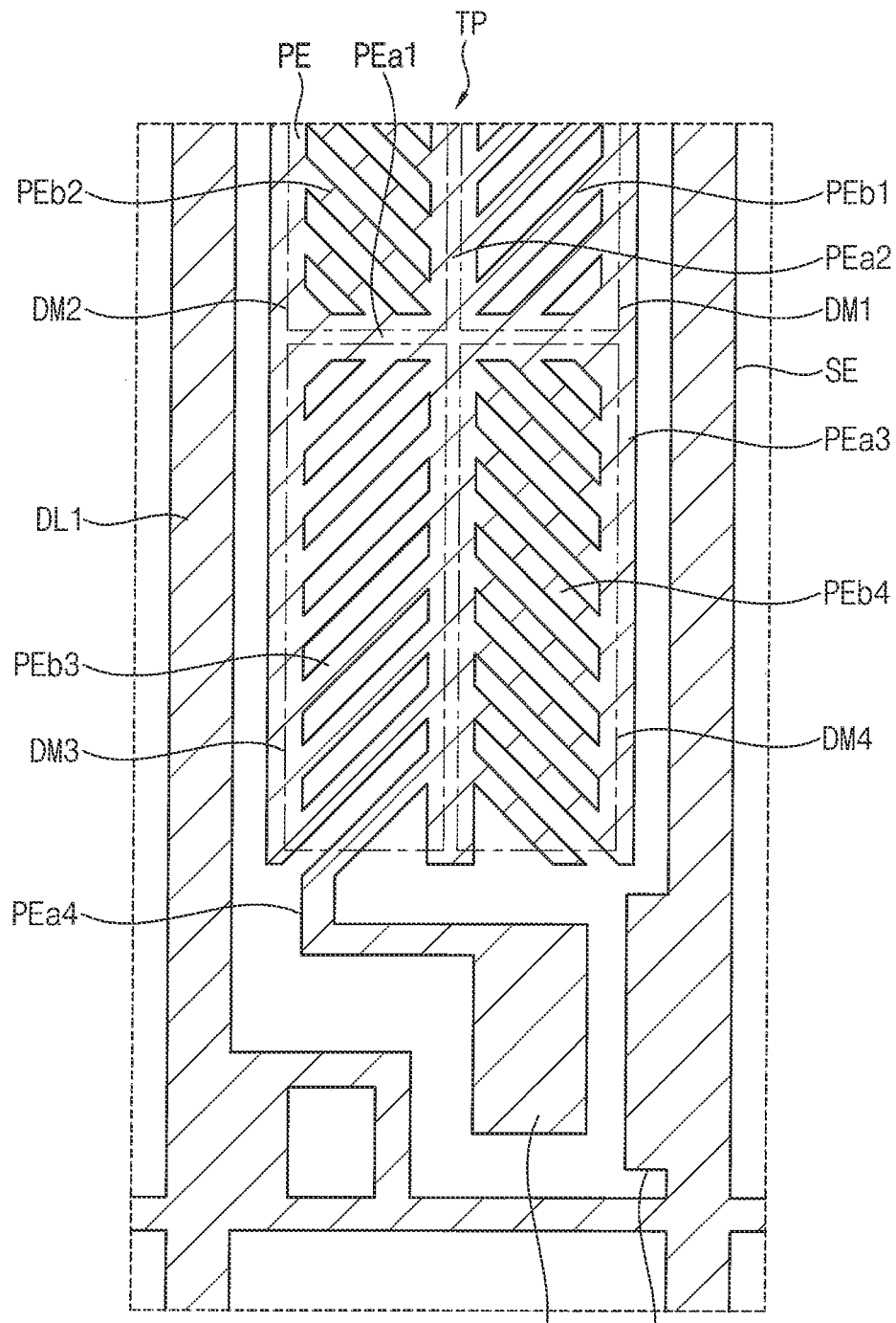
FIG. 9 is a diagram illustrating a transparent conductive pattern included in the first pixel in FIG. 8.
Figure 9:
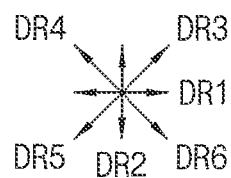

Referring to FIGS. 8 and 9, the shielding electrode SE of the display device according to an embodiment may include a second extending portion EP2 protruding to be between the second data line DL2 and the drain electrode extending portion OEP in a plan view. In other words, the second extending portion EP2 may protrude to be between the second data line DL2 and the pixel electrode connecting portion CP in a plan view.

In an embodiment, the second extending portion EP2 may extend in the first direction DR1. The second extending portion EP2 may extend from a first portion of the shielding electrode SE that overlaps the second data line DL2 toward a second portion of the shielding electrode SE that overlaps the first data line DL1 in a plan view.

In an embodiment, the second extending portion EP2 may at least partially overlap the first extending portion EP1. Because the insulation layers are disposed between the storage line RL and the shielding electrode SE, the second extending portion EP2 protruding from the shielding electrode SE may be insulated from and at least partially overlap the first extending portion EP1 protruding from the storage line RL.

The second extending portion EP2 may be disposed between the second data line DL2 and the drain electrode extending portion OEP in a plan view. The common voltage Vcom in FIG. 2 may be provided to the second extending portion EP2, so that the second extending portion EP2 may shield between the second data line DL2 and the drain electrode extending portion OEP together with the first extending portion EP1. Accordingly, the capacitance between the first pixel PX1 and the second data line DL2 may further decrease, and the capacitance deviation between the first pixel PX1 and the data lines DL1 and DL2 may decrease.

Hereinafter, a display device according to an embodiment will be described with reference to FIGS. 10 and 11. The display device described with reference to FIGS. 10 and 11 may be substantially the same as or similar to the display device described with reference to FIGS. 1 to 7 except for the first extending portion. Accordingly, descriptions on repeated elements will be omitted.

Figure 10:
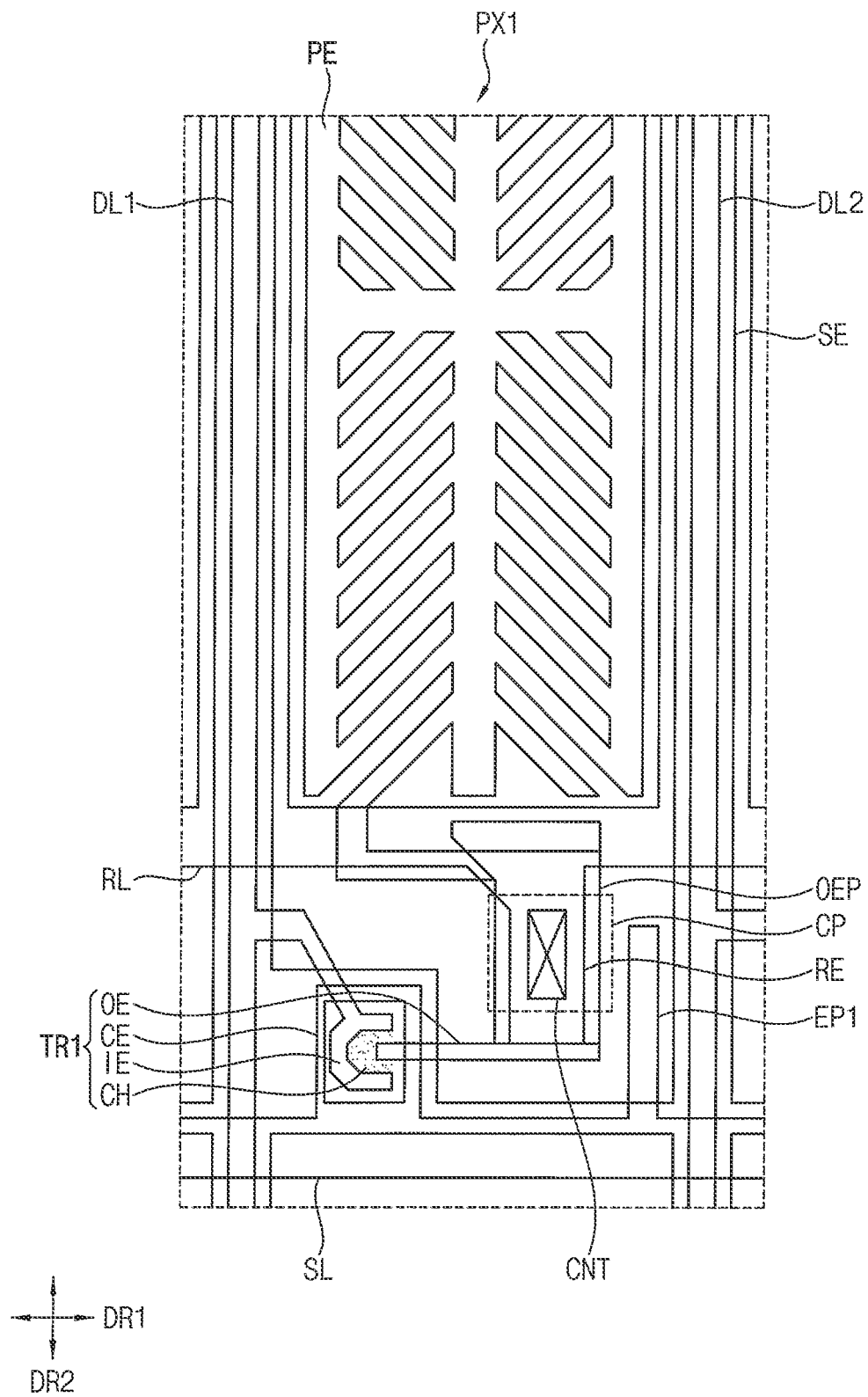
FIG. 10 is a layout diagram illustrating a first pixel of a display device according to an embodiment.

FIG. 10 is a layout diagram illustrating a first pixel of a display device according to an embodiment. FIG. 11 is a diagram illustrating a gate pattern included in the first pixel in FIG. 10.

Figure 11:
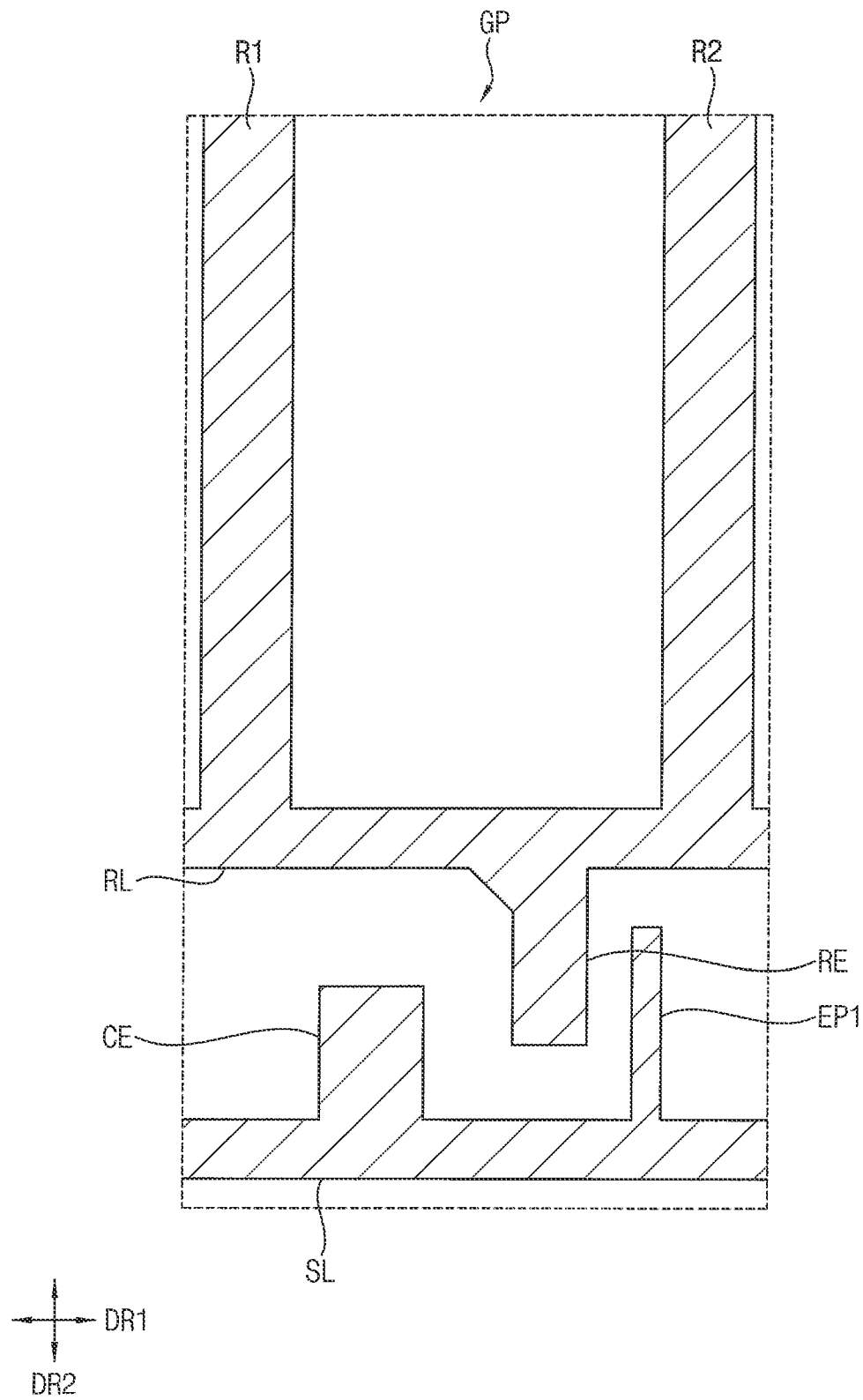
FIG. 11 is a diagram illustrating a gate pattern included in the first pixel in FIG. 10.

Referring to FIGS. 10 and 11, the scan line SL of the display device according to an embodiment may include a first extending portion EP1 protruding to be between the second data line DL2 and the drain electrode extending portion OEP in a plan view. In other words, the first extending portion EP1 may protrude to be between the second data line DL2 and the pixel electrode connecting portion CP in a plan view.

In an embodiment, the first extending portion EP1 may extend in the second direction DR2. The first extending portion EP1 may extend from the scan line SL toward the storage line RL between the second data line DL2 and the drain electrode extending portion OEP in a plan view.

Hereinafter, a display device according to an embodiment will be described with reference to FIG. 12. The display device described with reference to FIG. 12 may be substantially the same as or similar to the display device described with reference to FIGS. 10 and 11 except for a second extending portion. Accordingly, descriptions on repeated elements will be omitted.

Figure 12:
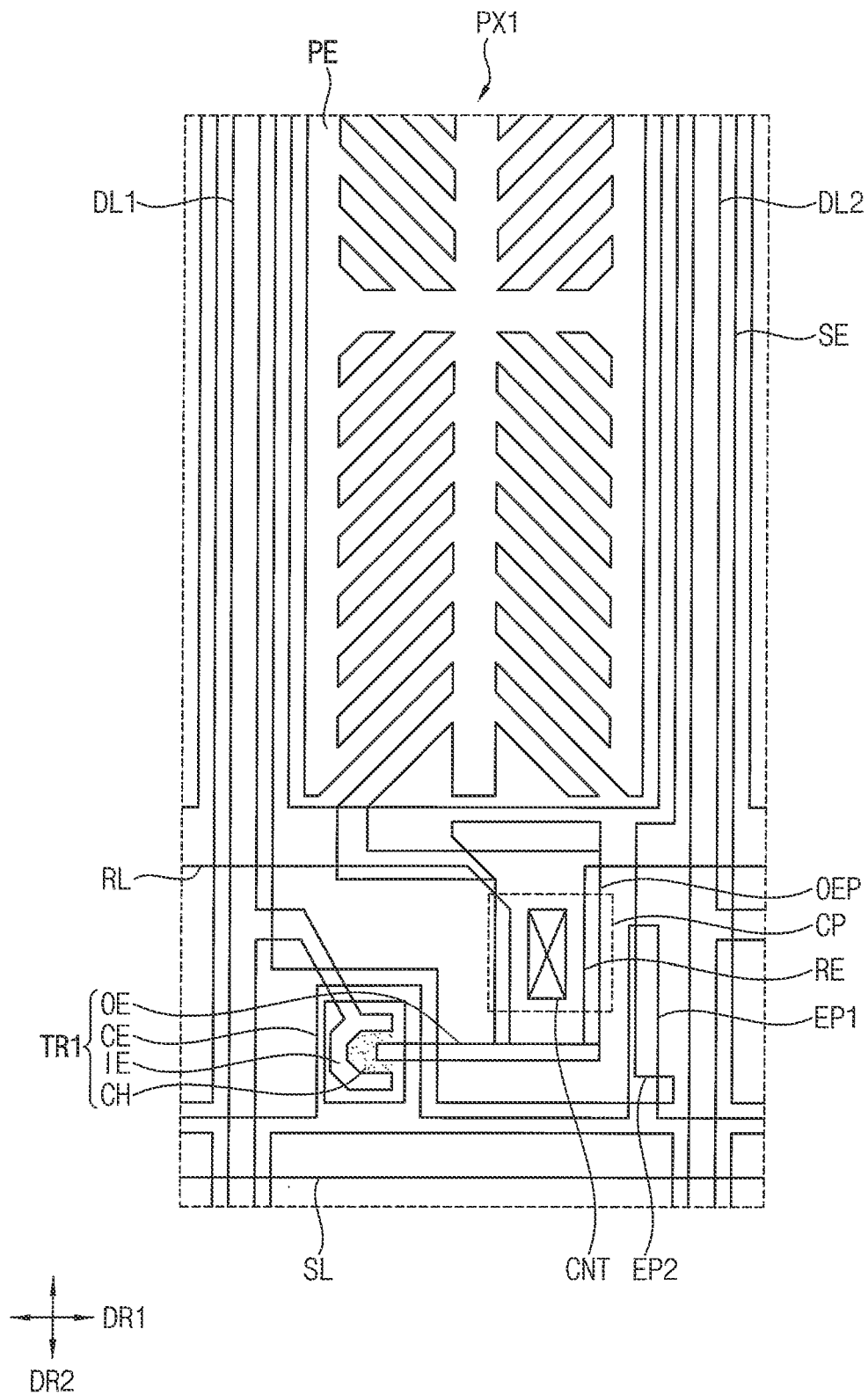
FIG. 12 is a layout diagram illustrating a first pixel of a display device according to an embodiment.

FIG. 12 is a layout diagram illustrating a first pixel of a display device according to an embodiment.

Referring to FIG. 12, the shielding electrode SE of the display device according to an embodiment may include a second extending portion EP2 protruding to be between the second data line DL2 and the drain electrode extending portion OEP in a plan view. In other words, the second extending portion EP2 may protrude to be between the second data line DL2 and the pixel electrode connecting portion CP in a plan view. In an embodiment, the second extending portion EP2 may extend in the first direction DR1.

In an embodiment, the second extending portion EP2 may at least partially overlap the first extending portion EP1. Because the insulation layers are disposed between the scan line SL and the shielding electrode SE, the second extending portion EP2 protruding from the shielding electrode SE may be insulated from and at least partially overlap the first extending portion EP1 protruding from the scan line SL.

The display device according to the embodiments may be applied to a display device included in a computer, a notebook, a mobile phone, a smartphone, a smart pad, a PMP, a PDA, an MP3 player, or the like.

Although the display devices according to the embodiments have been described with reference to the drawings, the illustrated embodiments are examples, and may be modified and changed by a person having ordinary knowledge in the relevant technical field without departing from the technical spirit described in the following claims.

What is claimed is:

1. A display of device, comprising:
a scan line extending in a first direction;
a storage line extending parallel to the scan line;
a first data line extending in a second direction crossing the first direction;
a second data line extending parallel to the first data line with no intervening data line disposed between the first data line and the second data line;
a transistor including a control electrode protruding from the scan line, a source electrode connected to the first data line and protruding from the first data line, and a drain electrode disposed between the source electrode and the second data line;
a pixel electrode partially overlapping the storage line and electrically connected to the drain electrode through a contact hole;
a first extending portion extending from the storage line along the second direction not to be overlapped with the pixel electrode and any contact hole formed on the first extending portion, and disposed between the second data line and the drain electrode in a plan view to reduce a capacitance deviation between a capacitance between the pixel electrode and the second data line and a capacitance between the pixel electrode and the first data line; and
a storage electrode extending from the storage line in a same direction as the first extending portion and spaced apart from the first extending portion along the first direction in the plan view,
wherein the first extending portion disposed between the second data line and the drain electrode is not overlapped with the second data line and the drain electrode, and
wherein the storage electrode and the first extending portion are disposed in an opposite side to a side where the control electrode is disposed with respect to a center line of the pixel electrode extending in the second direction.

2. The display device of claim 1, further comprising:
a shielding electrode including a stem portion and disposed directly on a same insulating layer as the pixel electrode, the shielding electrode overlapping the first data line and the second data line in the plan view.

3. The display device of claim 2, wherein the shielding electrode further includes a second extending portion extending from the stem portion and disposed between the second data line and the drain electrode in the plan view.

4. The display device of claim 3, wherein the second extending portion extends in the first direction.

5. The display device of claim 3, wherein the second extending portion at least partially overlaps the first extending portion in the plan view.

6. The display device of claim 1,
wherein an area of the storage electrode is less than an area of a drain electrode extending portion which extends from the drain electrode in the plan view.

7. The display device of claim 6, wherein the storage electrode overlaps the drain electrode.

8. The display device of claim 7, wherein a length of the first extending portion is equal to a length of the storage electrode in the second direction.

9. The display device of claim 7, wherein two opposite edges of the storage electrode are disposed between two opposite edges of the drain electrode in the first direction in the plan view.

10. The display device of claim 7, wherein an edge of the pixel electrode is disposed between the storage electrode and a shielding electrode in the plan view.

* * * * *